US012420729B2

(12) United States Patent
Smith et al.

(10) Patent No.: US 12,420,729 B2
(45) Date of Patent: Sep. 23, 2025

(54) ELECTRIFIED VEHICLE BATTERY PACKS WITH POLYMER-BASED ENCLOSURES

(71) Applicant: FORD GLOBAL TECHNOLOGIES, LLC, Dearborn, MI (US)

(72) Inventors: Thomas Edward Smith, Livonia, MI (US); Patrick Daniel Maguire, Ann Arbor, MI (US); Kanchana Perumalla, Troy, MI (US); Mohammadreza Eftekhari, Novi, MI (US); Saravanan Paramasivam, South Lyon, MI (US); James Maurice Boileau, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 18/661,894

(22) Filed: May 13, 2024

(65) Prior Publication Data

US 2024/0294131 A1 Sep. 5, 2024

Related U.S. Application Data

(62) Division of application No. 17/376,380, filed on Jul. 15, 2021, now Pat. No. 12,012,058.

(60) Provisional application No. 63/052,822, filed on Jul. 16, 2020.

(51) Int. Cl.
*B60R 16/04* (2006.01)
*B60K 1/04* (2019.01)
*B60L 50/64* (2019.01)
*H01M 50/249* (2021.01)

(52) U.S. Cl.
CPC ............... *B60R 16/04* (2013.01); *B60K 1/04* (2013.01); *B60L 50/64* (2019.02); *H01M 50/249* (2021.01)

(58) Field of Classification Search
CPC ...... B60R 16/04; B60L 50/64; H01M 50/249; H01M 4/808; B60K 1/04
See application file for complete search history.

(56) References Cited

U.S. PATENT DOCUMENTS

| 4,214,045 | A | 7/1980 | Jutte et al. |
| 6,145,612 | A | 11/2000 | Dickie |
| 8,276,697 | B2 | 10/2012 | Takasaki |
| 8,859,132 | B2 | 10/2014 | West et al. |
| 9,515,305 | B2 | 12/2016 | Kwag |
| 9,853,263 | B2 | 12/2017 | Baek et al. |
| 11,996,576 | B2 * | 5/2024 | Foran |
| 2009/0139781 | A1 * | 6/2009 | Straubel |

(Continued)

FOREIGN PATENT DOCUMENTS

| CN | 205248331 U | 5/2016 | |
| CN | 106784451 A | 5/2017 | |
| DE | 102017210025 A1 * | 5/2018 | ............... B60K 1/04 |

*Primary Examiner* — James A Shriver, II
*Assistant Examiner* — Nicholas R. Kandas
(74) *Attorney, Agent, or Firm* — David B. Kelley; Carlson, Gaskey & Olds, P.C.

(57) ABSTRACT

Battery pack designs for use in electrified vehicles may include a polymer-based enclosure having features for sealing external joints, retaining components inside the battery pack, securing electrical and coolant lines to the polymer-based enclosure, etc. The proposed designs reduce the number of overall parts in assembly, such as fasteners and brackets, and simplify the overall battery pack manufacturing and assembly processes.

19 Claims, 14 Drawing Sheets

(56) References Cited

U.S. PATENT DOCUMENTS

| | | |
|---|---|---|
| 2016/0141584 A1 | 5/2016 | Eichorn |
| 2018/0358493 A1 | 12/2018 | Iwamoto et al. |
| 2019/0221793 A1 | 7/2019 | Krueger et al. |
| 2019/0221802 A1 | 7/2019 | Maguire et al. |
| 2019/0334136 A1 | 10/2019 | Eftekhari et al. |
| 2019/0376287 A1 | 12/2019 | Bennett et al. |
| 2019/0381751 A1 | 12/2019 | Matlack et al. |
| 2020/0036067 A1* | 1/2020 | Mummigatti |

* cited by examiner

ELECTRIFIED VEHICLE BATTERY PACKS WITH POLYMER-BASED ENCLOSURES

CROSS-REFERENCE TO RELATED APPLICATIONS

This is a divisional of U.S. patent application Ser. No. 17/376,380, filed Jul. 15, 2021, which claims the benefit of U.S. Provisional Application No. 63/052,822, filed on Jul. 16, 2020, the entire disclosures of which are incorporated herein by reference.

TECHNICAL FIELD

This disclosure relates to electrified vehicle battery packs, and more particularly to polymer-based battery pack enclosures that incorporate features for, among other things, sealing external joints, achieving battery internal component retention, and securing electrical/coolant lines to the polymer-based enclosures.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage traction battery pack typically powers the electric machines and other electrical loads of the electrified vehicle. An enclosure of the battery pack houses a plurality of battery cells that store energy for powering these electrical loads. Various other internal components, including but not limited to a battery electric control module (BECM), a bussed electrical center (BEC), wiring, and I/O connectors, are also housed inside the enclosure.

SUMMARY

A battery pack according to an exemplary aspect of the present disclosure includes, among other things, an enclosure assembly including a tray, a mid-tray, and a cover. The mid-tray is secured to the tray at a tongue and groove connection. At least one of a tape seal or a liquid seal is applied at an external seam associated with the tongue and groove connection.

In a further non-limiting embodiment of the foregoing battery pack, the tape seal is secured to an exterior surface of the mid-tray and to an exterior surface of the tray and extends across the exterior seam.

In a further non-limiting embodiment of either of the foregoing battery packs, the tape seal is secured in place with an adhesive.

In a further non-limiting embodiment of any of the foregoing battery packs, the liquid seal is positioned between a lip of the tray and a lip of the mid-tray.

In a further non-limiting embodiment of any of the foregoing battery packs, both the tape seal and the liquid seal are applied at the external seam.

In a further non-limiting embodiment of any of the foregoing battery packs, the tongue and groove connection includes a tongue that protrudes upwardly from a lip of the tray and a groove formed in a lower surface of the mid-tray. The tongue is received within the groove.

A battery pack according to another exemplary aspect of the present disclosure includes, among other things, an electrical subassembly, a foam shell disposed around the electrical subassembly to establish a foamed electrical subassembly, and a battery array connected to the foamed electrical subassembly.

In a further non-limiting embodiment of the foregoing battery pack, the foamed electrical subassembly and the battery array are housed within a polymer-based enclosure assembly.

In a further non-limiting embodiment of either of the foregoing battery packs, the electrical subassembly includes one or more wiring harnesses, one or more wiring looms, and one or more I/O connectors.

In a further non-limiting embodiment of any of the forgoing battery packs, the foam shell substantially fills all gaps between adjacent components of the electrical subassembly.

In a further non-limiting embodiment of any of the forgoing battery packs, the foamed electrical subassembly is positioned over top of the battery array.

In a further non-limiting embodiment of any of the forgoing battery packs, the foamed electrical subassembly is connected to and positioned over top of a second battery array.

A battery pack according to another exemplary aspect of the present disclosure includes, among other things, a polymer-based enclosure and a connector secured to the polymer-based enclosure. The connector includes a connector body and a weld flange that circumscribes the connector body. An electrical or coolant line is secured to the connector body.

In a further non-limiting embodiment of the foregoing battery pack, an interference contact bead of the weld flange is received within a multi-level groove formed in the polymer-based enclosure.

In a further non-limiting embodiment of either of the foregoing battery packs, the interference contact bead is received in abutting contact with a sub-flush center portion of the multi-level groove.

In a further non-limiting embodiment of any of the foregoing battery packs, the sub-flush center portion protrudes outwardly from a floor of the multi-level groove. A sub-flush pocket of the multi-level groove extends to the floor at each side of the sub-flush center portion.

In a further non-limiting embodiment of any of the foregoing battery packs, the weld flange includes a contact surface that is located outboard of the interference contact bead and is positioned in contact with an exterior wall of the polymer-based enclosure.

In a further non-limiting embodiment of any of the foregoing battery packs, the connector includes a gripping flange that extends outwardly from the weld flange and establishes a surface area for holding the connector.

In a further non-limiting embodiment of any of the foregoing battery packs, a second gripping flange is provided at an interior surface of an exterior wall of the polymer-based enclosure.

In a further non-limiting embodiment of any of the foregoing battery packs, the connector includes a thermoplastic material that is weldable to the polymer-based enclosure.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs for use in electrified vehicles. Exemplary battery packs may include a polymer-based enclosure having features for sealing external joints, retaining components inside the battery pack, securing electrical and coolant lines to the polymer-based enclosure, etc. These and other features are discussed in greater detail in the following paragraphs of this detailed description.

Figure 1:
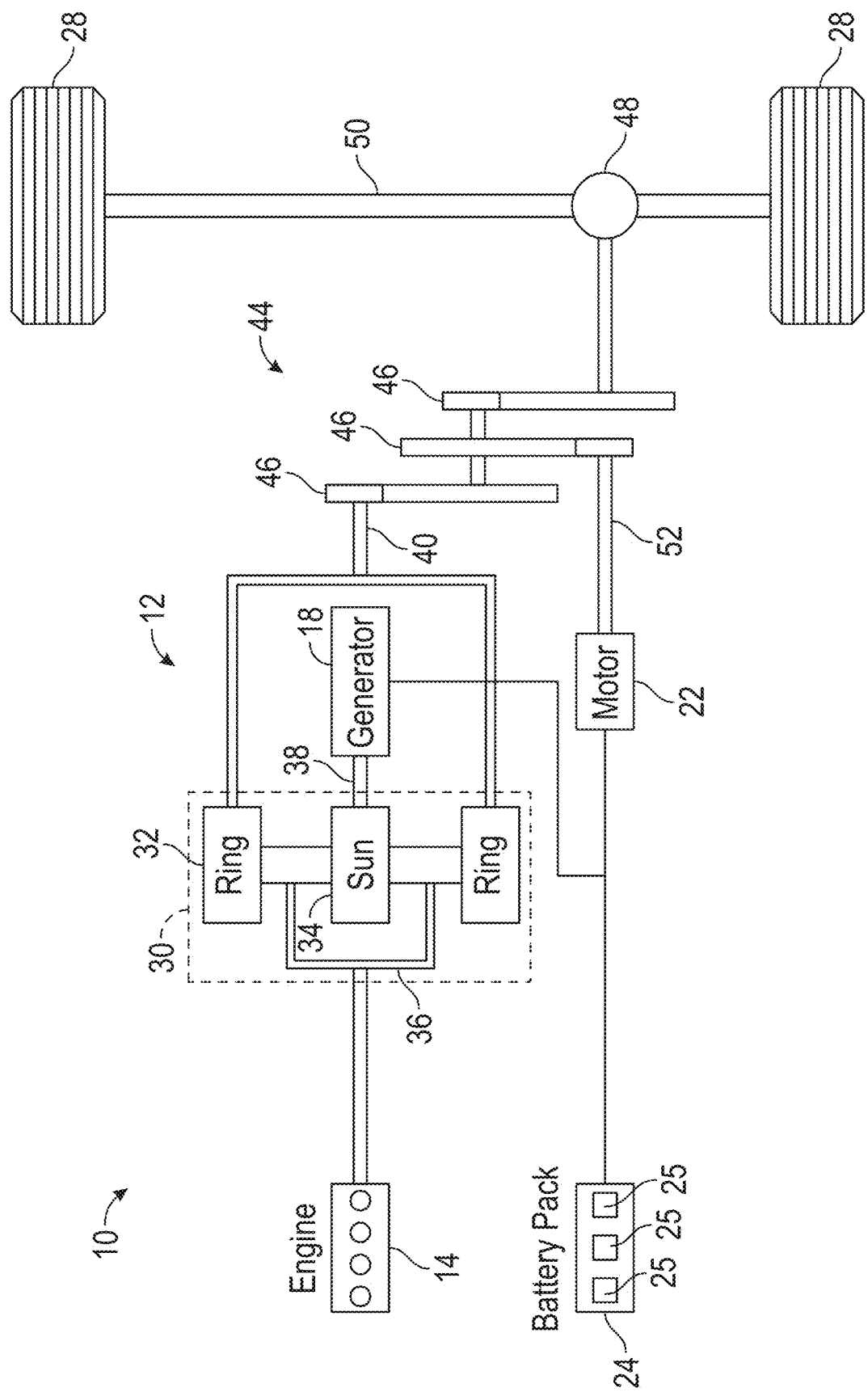
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery that includes a plurality of battery arrays 25 (i.e., battery assemblies or groupings of battery cells) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
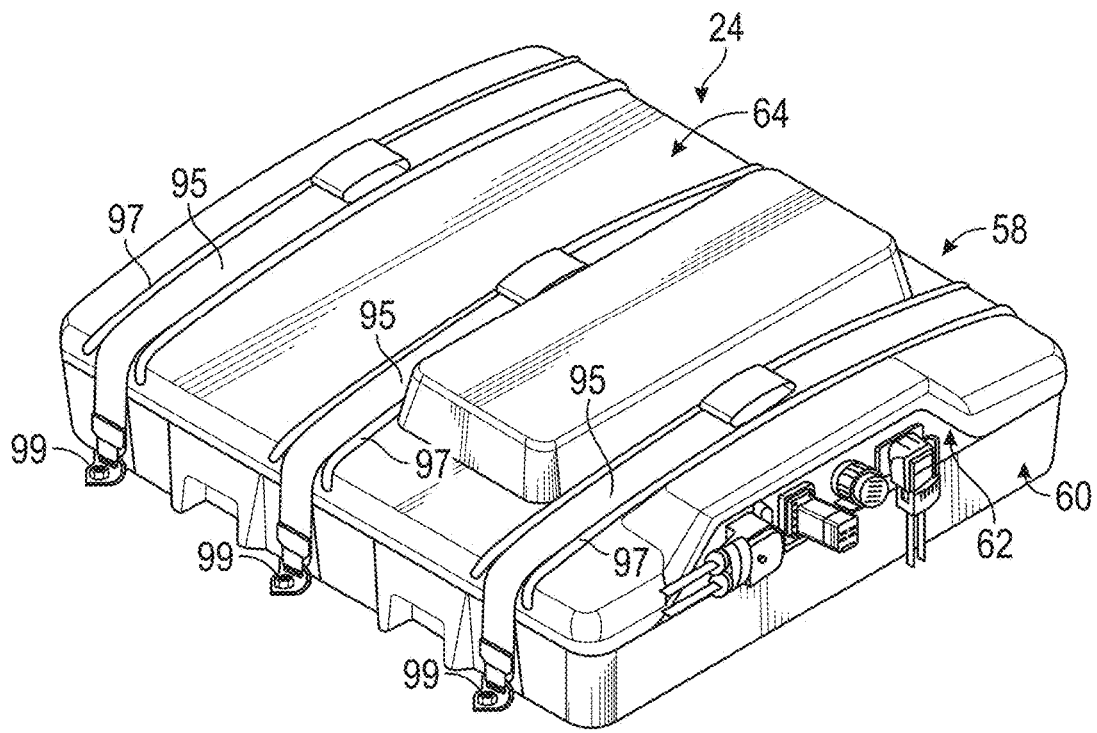
FIG. 2 illustrates a battery pack of an electrified vehicle.
Figure 3:
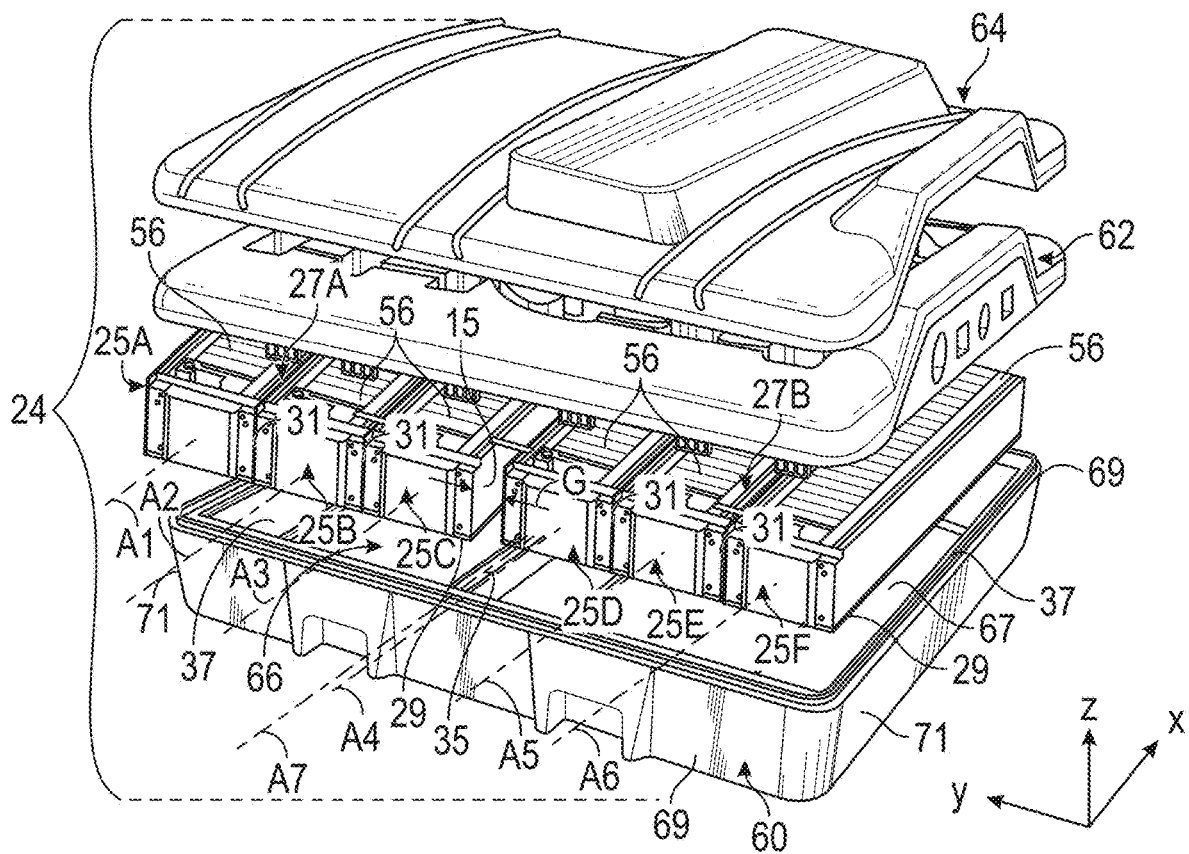
FIG. 3 is an exploded view of the battery pack of FIG. 2.

FIGS. 2 and 3 schematically illustrate a battery pack 24 that can be employed within an electrified vehicle. For example, the battery pack 24 could be part of the powertrain 10 of the electrified vehicle 12 of FIG. 1. FIG. 2 is a perspective view of the battery pack 24, and FIG. 3 is an exploded view of the battery pack 24 for better illustrating the internal components of the battery pack 24.

The battery pack 24 houses a plurality of battery cells 56 (see FIG. 3) that store energy for powering various electrical loads of the electrified vehicle 12. The battery pack 24 could employ any number of battery cells within the scope of this disclosure. Thus, this disclosure is not limited to the exact configuration shown in FIG. 3.

The battery cells 56 may be stacked side-by-side to construct a grouping of battery cells 56, sometimes referred to as a "cell stack" or "cell array." In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery cells 56, along with any support structures (e.g., array frames, spacers, rails, walls, plates, bindings, etc.), may collectively be referred to as a battery array or battery assembly. The battery pack 24 depicted in FIG. 3 includes a first battery array 25A, a second battery array 25B, a third battery array 25C, a fourth battery array 25D, a fifth battery array 25E, and a sixth battery array 25F. Although the battery pack 24 is depicted as including six battery arrays 25, the battery pack 24 could include a greater or fewer number of battery arrays and still fall within the scope of this disclosure. Unless stated otherwise herein, when used without any alphabetic identifier immediately following the reference numeral, reference numeral "25" may refer to any of the battery arrays 25A-25F.

The battery cells 56 of the first battery array 25A are distributed along a first longitudinal axis A1, the battery cells 56 of the second battery array 25B are distributed along a second longitudinal axis A2, the battery cells 56 of the third battery array 25C are distributed along a third longitudinal axis A3, the battery cells 56 of the fourth battery array 25D are distributed along a fourth longitudinal axis A4, the battery cells 56 of the fifth battery array 25E are distributed along a fifth longitudinal axis A5, and the battery cells 56 of the sixth battery array 25F are distributed along a sixth longitudinal axis A6. In an embodiment, the longitudinal axes A1 through A6 are laterally spaced from one another once the battery arrays 25 are positioned inside the battery pack 24.

In an embodiment, the battery arrays 25A, 25B, and 25C are grouped together to establish a first battery array assembly 27A, and the battery arrays 25D, 25E, and 25F are grouped together to establish a second battery array assembly 27B. In addition to including one or more battery arrays 25, each battery array assembly 27A, 27B may include a heat exchanger plate 29 (i.e., a cold plate) and one or more foam spacers 31 that are disposed between adjacent battery arrays 25 of each battery array assembly 27A, 27B. Although each battery array assembly 27A, 27B is shown including three battery arrays, it should be understood that the battery array assemblies 27A, 27B could include one or more battery arrays 25.

Each battery array 25 of the battery pack 24 may be positioned relative to the heat exchanger plate 29 such that the battery cells 56 are either in direct contact with or in close proximity to the heat exchanger plate 29. The heat exchanger plates 29 may be part of a liquid cooling system that is associated with the battery pack 24 and is configured for thermally managing the battery cells 56 of each battery array 25. For example, heat may be generated and released by the battery cells 56 during charging operations, discharging operations, extreme ambient conditions, or other conditions. It may be desirable to remove the heat from the battery pack 24 to improve capacity, life, and performance of the battery cells 56. The heat exchanger plates 29 are configured to conduct the heat out of the battery cells 56. In other words, the heat exchanger plates 29 acts as heat sinks for removing heat from the heat sources (i.e., the battery cells 56). The heat exchanger plates 29 could alternatively be employed to heat the battery cells 56, such as during extremely cold ambient conditions, for example.

An enclosure assembly 58 houses each battery array 25 of the battery pack 24. In an embodiment, the enclosure assembly 58 is a sealed enclosure. The enclosure assembly 58 may include any size, shape, and configuration within the scope of this disclosure.

In an embodiment, the enclosure assembly 58 includes a tray 60, a mid-tray 62, and a cover 64. The tray 60, the mid-tray 62, and the cover 64 cooperate to surround and enclose the battery arrays 25.

The tray 60 provides an open area 66 for holding the battery array assemblies 27A, 27B. In an embodiment, the battery array assemblies 27A, 27B are positionable within the open area 66 of the tray 60. The open area 66 may be established by a floor 67, opposing side walls 69, and opposing side walls 71 (which connect between the opposing side walls 69) of the tray 60. In an embodiment, the opposing side walls 69, 71 protrude upwardly at the outermost perimeter of the floor 67.

The mid-tray 62 may be seated and sealed onto the tray 60, such as via a tongue and groove connection (discussed in greater detail below). The mid-tray 62 may be approximately the same width and length as the tray 60 such that it engages up to four sides of the tray 60 when seated. The cover 64 may next be seated over the mid-tray 62 and sealed to it to enclose the battery array assemblies 27A, 27B. Once both are secured in their respective positions, the mid-tray 62 and the cover 64 may be received together in a nesting fashion.

As shown in FIG. 2, a portion of the mid-tray 62 may be exposed outside of the enclosure assembly 58. However, the mid-tray 62 could alternatively be completely housed inside the enclosure assembly 58.

The enclosure assembly 58 could have other configurations within the scope of this disclosure. For instance, the mid-tray 62, the cover 64, or both could provide some of the open area 66 for receiving the battery arrays 25. In addition, although shown as being substantially rectangular, the enclosure assembly 58 could be triangular, round, square, etc.

In an embodiment, the tray 60 and the mid-tray 62 are constructed (e.g., molded) of an expanded polymer-based material, and the cover 64 is constructed (e.g., molded) of a solid polymer-based material. In another embodiment, the cover 64 is also constructed from an expanded polymer-based material. In yet another embodiment, the cover 64 is constructed from a metallic material. In yet another embodiment, the tray 60 is constructed from a solid polymer based material or a metallic based material.

Exemplary expanded polymer-based materials can include, but are not limited to, expanded polypropylene, expanded polystyrene, and expanded polyethylene. Generally, these polymer-based materials are considered relatively structural foamed polymer-based materials.

Exemplary solid polymer-based materials can include, but are not limited to, sheet moulding compounds (e.g., glass-fiber reinforced polyester), polypropylene, and polyamine. Generally, these polymer-based materials are considered more rigid than the expanded polymer based materials discussed above.

In an embodiment, the battery pack 24 is retained to a vehicle body of the electrified vehicle 12 by one or more straps 95 (see FIG. 2). The straps 95 may be received within grooves 97 formed in the cover 64 of the enclosure assembly 58 and may be fastened to the vehicle body by fasteners 99. The cover 64 may be configured to transfer loads from the straps 95 to the mid-tray 62 and/or the tray 60.

Figure 4:
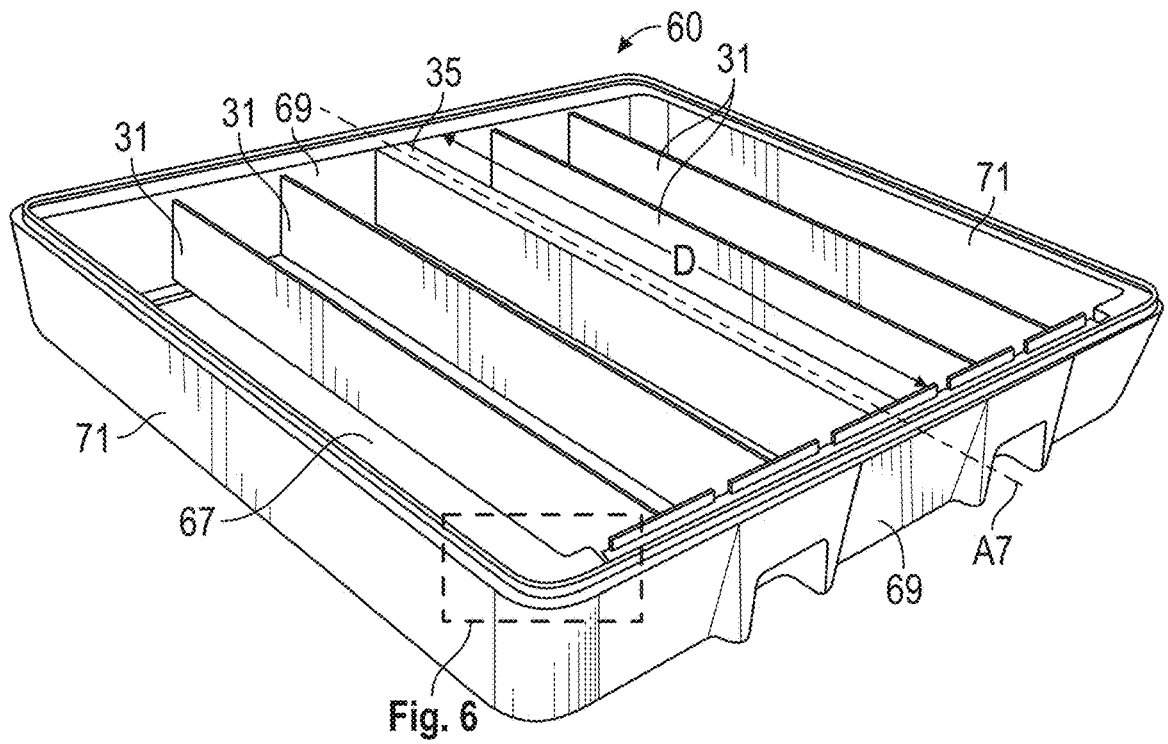
FIG. 4 illustrates a tray of the battery pack of FIG. 2.

Referring now to FIGS. 3 and 4, another foam spacer 35 may be positioned between the first battery array assembly 27A and the second battery array assembly 27B. In an embodiment, the foam spacer 35 is positioned near a center of the tray 60 and extends along a longitudinal axis A7 that is parallel to the axes A1-A6 of the battery arrays 25. The foam spacer 35 may span an entire distance D (see FIG. 4) between the opposing side walls 69 of the tray 60. The foam spacer 35 may additionally fill an entire gap G (see FIG. 3) that extends between the first battery array assembly 27A and the second battery array assembly 27B.

The foam spacers 31 that are disposed between adjacent battery arrays 25 of each battery array assembly 27A, 27B may extend in parallel with the longitudinal axis A7 of the foam spacer 35. Each foam spacer 31 may additionally extend the entire distance D between the opposing side walls 69 of the tray 60.

In yet another embodiment, additional foam spacers 37 may be disposed between the side walls 71 of the tray 60 and each of the first and second battery array assemblies 27A, 27B. The foam spacers 37 may also extend in parallel with the longitudinal axis A7 of the foam spacer 35. Each foam spacer 37 may additionally extend the entire distance D between the opposing side walls 69 of the tray 60.

In an embodiment, the foam spacers 31, 35, and 37 are at least as long as the battery arrays 25. However, the exact dimensions of the foam spacers 31, 35, and 37 are not intended to limit this disclosure.

Once the battery array assemblies 27A, 27B are positioned atop the floor 67 of the tray 60, the foam spacer 35 fills the space between the battery array assemblies 27A, 27B, the foam spacers 37 fill the space between the far left and far right sides of tray 60 and the battery array assemblies 27A, 27B, and the foam spacers 31 fill the spaces between adjacent battery arrays 25 of the battery array assemblies 27A, 27B. Therefore, all of the parts that are installed onto the tray 60 are fitted together with little to no gap or clearance therebetween. This "gapless" arrangement between the internals parts of the battery pack 24 helps transfer loads inside the battery pack 24 during impact events and also helps dampen and transfer durability loads.

The side walls 69 and the side walls 71 of the tray 60 retain the battery array assemblies 27A, 27B in the X-axis and Y-axis directions, respectively. The tray 60 may additionally include various snap-in features (e.g., beams, protrusions, etc.) that are molded into the floor 67 and/or the side walls 69, 71 of the tray 60 for retaining the battery array assemblies 27A, 27B in the Z-axis direction. The foam spacers 31, 35, 37 may additionally be secured to the tray 60 via various snap-in features that are molded into the floor 67 and/or the side walls 69, 71 of the tray 60. Since the battery array assemblies 27A, 27B and the foam spacers 31, 35, 37 can be mechanically retained in each of the X, Y, and Z-axis directions, there is no need for additional fasteners to retain any of the components within the tray 60.

Figure 5:
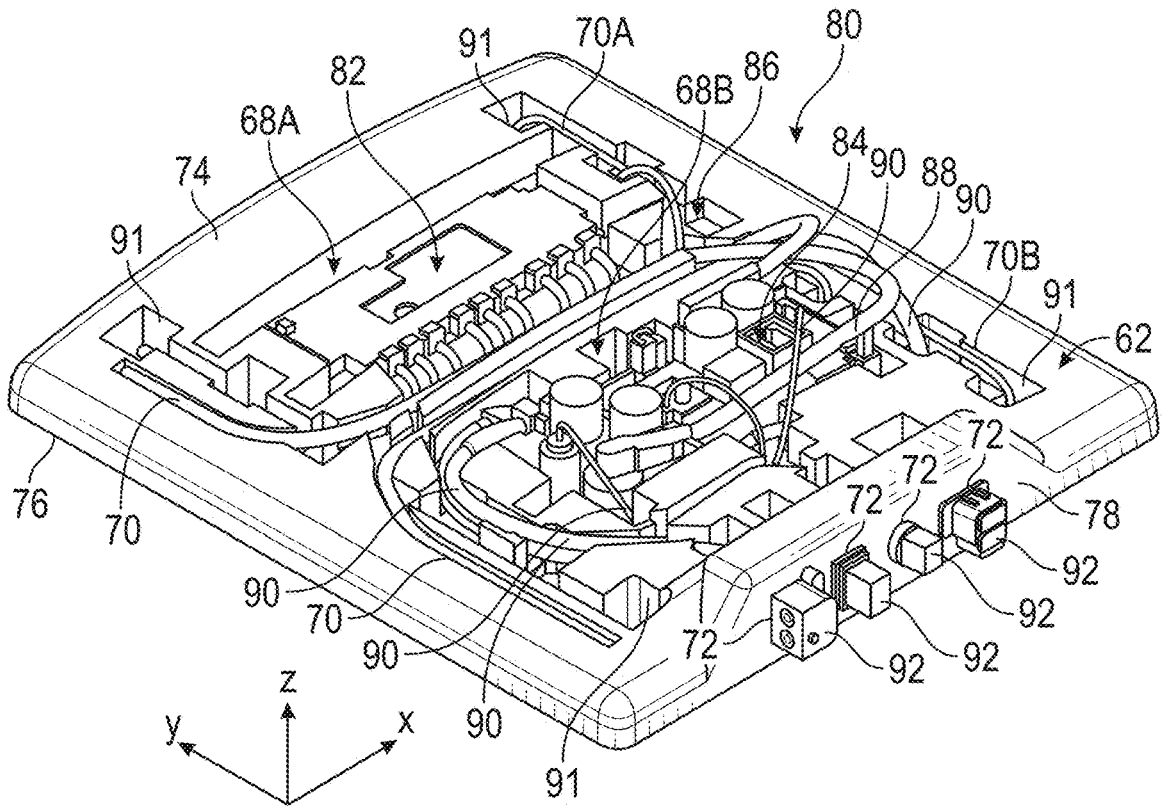
FIG. 5 illustrates a mid-tray of the battery pack of FIG. 2. The mid-tray is shown packaged together with a plurality of internal components for establishing an electrical subassembly inside the battery pack.
Figure 6:
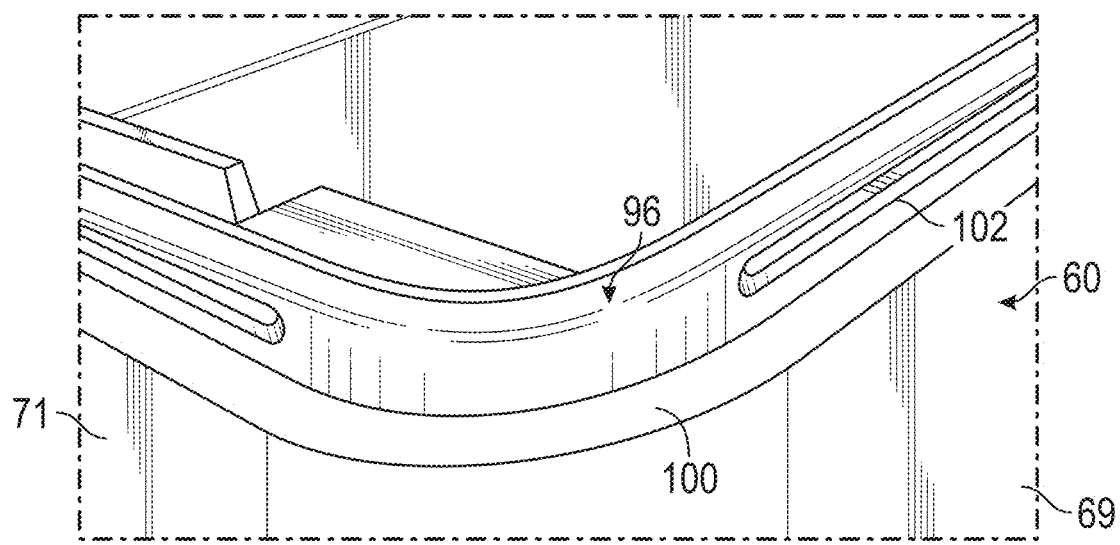
FIG. 6 is a blown-up view of a portion of the tray of FIG. 4.
Figure 7:
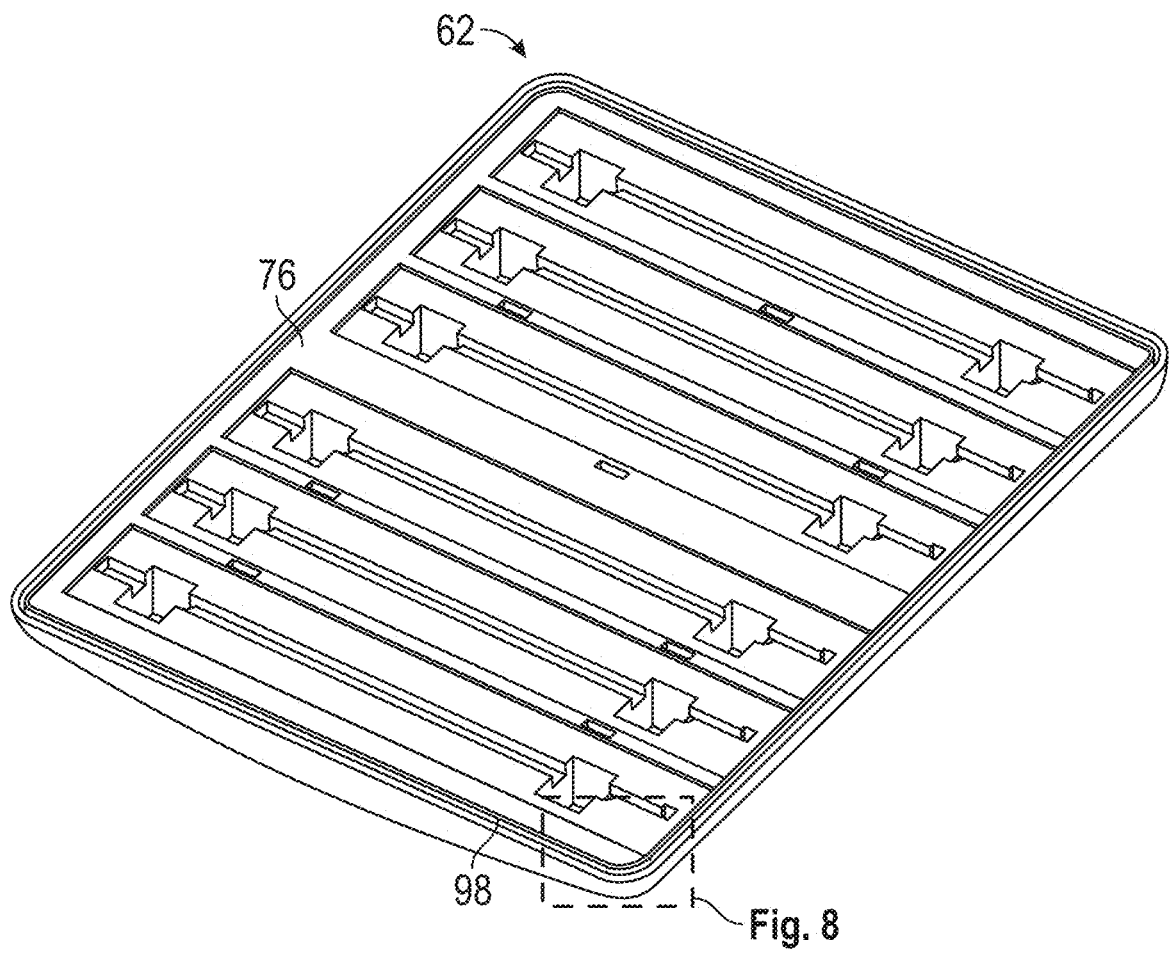
FIG. 7 illustrates a lower surface of the mid-tray of FIG. 5.
Figure 8:
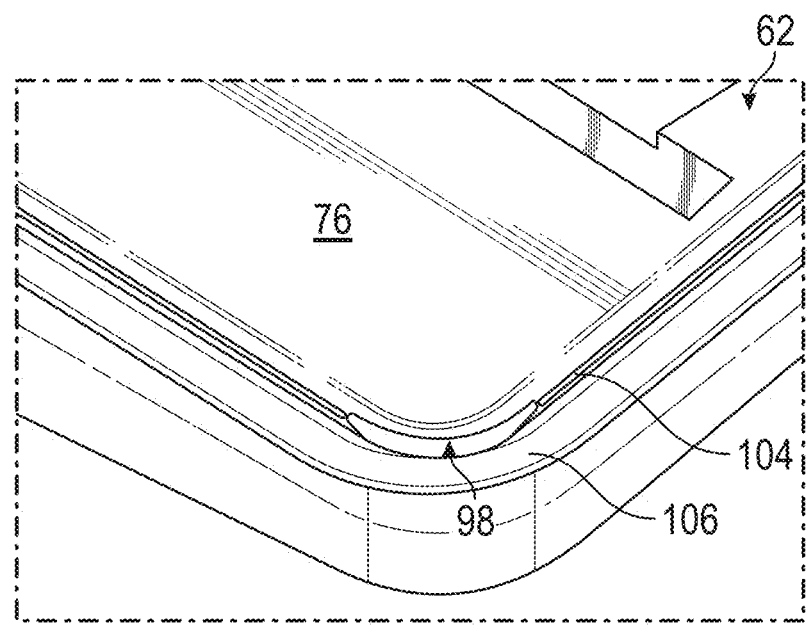
FIG. 8 is a blown-up view of a portion of the mid-tray of FIG. 7.

FIG. 5, with continued reference to FIGS. 2 and 3, illustrates additional details of the mid-tray 62 of the enclosure assembly 58. The mid-tray 62 may include various molded-in features for routing and/or retaining internal components within the mid-tray 62. The size, shape, location, and configuration of the molded-in features shown in FIG. 5 are exemplary only and are not intended to limit this disclosure.

In an embodiment, the mid-tray 62 includes pockets 68A, 68B, channels 70, and core holes 72 that are each designed to accommodate one or more additional internal components of the battery pack 24. The pockets 68A, 68B and the channels 70 may be formed within an upper surface 74 of the mid-tray 62. The upper surface 74 faces toward the cover 64 when the mid-tray 62 is positioned within the enclosure assembly 58. Some of the pockets 68 or the channels 70 could extend through or be formed in a lower surface 76 of the mid-tray 62. The core holes 72 may be formed through a side wall 78 of the mid-tray 62. In another embodiment, the core holes 72 are formed through a trough in the upper surface 74 or the lower surface 76 of the mid-tray 62. In yet another embodiment, the core holes 72 may have a slot cut into them from the top edge to the hole for sliding internal components into the core holes 72.

The mid-tray 62 and a plurality of internal electronic components (see features 82 through 88) may be packaged together to establish an electrical subassembly 80 of the battery pack 24. Together, the battery array assemblies 27A, 27B and the electrical subassembly 80 establish a battery system of the battery pack 24.

The mid-tray 62 and the internal components can be preassembled together to form the electrical subassembly 80 before final assembly of the enclosure assembly 58. In this way, the mid-tray 62 and the internal components are already packaged together when the enclosure assembly 58 is assembled during manufacturing. Thus, the electrical subassembly 80 increases line efficiency by allowing the mid-tray 62 and the internal components to be assembled in parallel with the rest of the battery pack 24, thereby decreasing manufacturing complexity and cost.

In an embodiment, the internal components that may be packaged within the mid-tray 62 include a bussed electrical center (BEC) 82, a battery electric control module (BECM) 84, a first wiring harness 86, a second wiring harness 88, a plurality of wiring looms 90, and a plurality of I/O connectors 92. Of course, other internal components could also be retained within the mid-tray 62. The BEC 82 and the BECM 84 may be secured within respective pockets 68A, 68B of the mid-tray 62, the wiring harnesses 86, 88 and the wiring looms 90 may be secured within respective channels 70 of the mid-tray 62, and the I/O connectors 92 may be secured within respective core holes 72 of the mid-tray 62.

The electronic components 82-88 may be routed and/or retained within the mid-tray 62 to assemble the electrical subassembly 80 in the following non-limiting manner. First, the BEC 82 is inserted into the first pocket 68A and the BECM 84 is inserted into the second pocket 68B of the mid-tray 62. The first wiring harness 86 is next inserted into a channel 70A of the mid-tray 62 and is connected to the BEC 82. The wiring looms 90 are then routed through their respective channels 70, snaked through one of the core holes 72, and then connected to one of the I/O connectors 92. Alternatively, the I/O connectors 92 may be pre-assembled to the wiring looms 90, in which case the assembly process could include feeding the wiring looms 90 through the core holes 72 first and then positioning the wiring looms 90 within their respective channels 70. Finally, the second wiring harness 88 is inserted into a channel 70B of the mid-tray 62 and is connected to the BECM 84.

In another embodiment, the pockets 68A, 68B and the channels 70 each include finger clearances 91 that are molded into the mid-tray 62. For example, the finger clearances 91 may be formed in pocket walls associated with the pockets 68A, 68B, and/or may be formed in channel walls associated with the channels 70. The finger clearances 91 make it easier for an assembly worker to route and retain the electronic components 82-88 relative to the mid-tray 62 during the assembly process.

Each of the first pocket 68A and the second pocket 68B may include various features, including snap-in features, for retaining the internal components (here, features 82 and 84) in the X, Y, and Z-axis directions. For example, as the BEC 82 and the BECM 84 are inserted into the pockets 68A, 68B, respectively, these components are snap-fit into place and retained from further movement in the Z-axis direction. The first and second wiring harnesses 86, 88, and the wiring looms 90 could be similarly retained in the Z-axis direction via one or more snap-fit features. Since the internal components of the electrical subassembly 80 are mechanically retained in the X, Y, and Z-axis directions, there is no need for additional fasteners, such as screws, bolts, etc., to retain any of the components within the mid-tray 62.

FIGS. 6-9, with continued reference to FIGS. 2-4, illustrate a tongue and groove connection for seating and sealing the mid-tray 62 onto the tray 60. In an embodiment, a tongue 96 of the tongue and groove connection is provided by the tray 60, and a groove 98 of the tongue and groove connection is provided by the mid-tray 62. However, an opposite configuration is also contemplated within the scope of this disclosure in which the tongue 96 of the tongue and groove connection is provided by the mid-tray 62 and the groove 98 of the tongue and groove connection is provided by the tray 60.

The tongue 96 may protrude upwardly from a lip 100 established by the side walls 69, 71 of the tray 60. The tongue 96 may extend about an entire perimeter of the lip 100. A protrusion 102 may extend from each side of the tongue 96. The groove 98 may be formed in the lower surface 76 of the mid-tray 62. The groove 98 may extend about an entire outer perimeter of the lower surface 76. A slot 104 may extend from each side of the groove 98. In addition, a lip 106 may circumscribe the groove 98.

Figure 9:
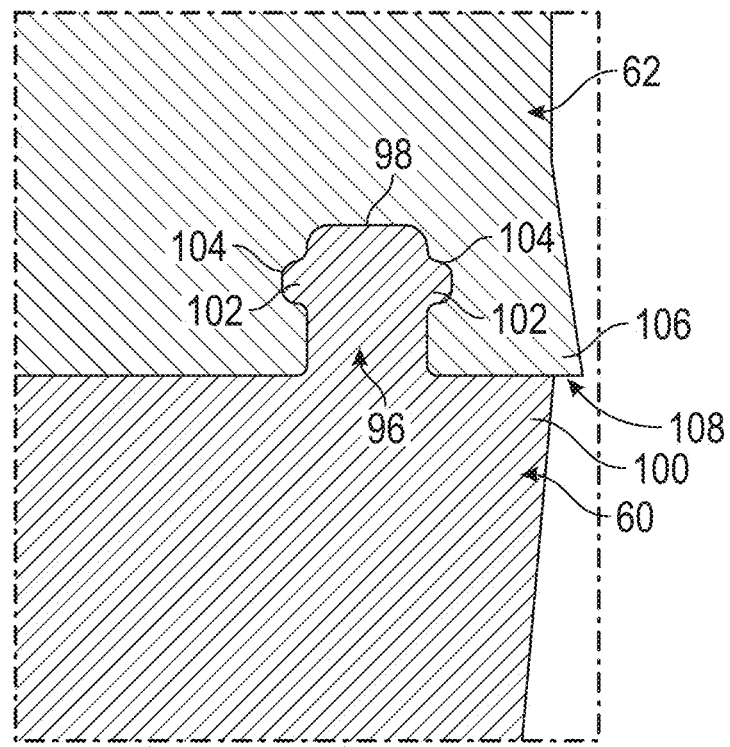
FIG. 9 illustrates a tongue and groove connection between the mid-tray of FIG. 5 and the tray of FIG. 4.

Referring now to FIG. 9, the tongue 96 may be received within the groove 98 as the mid-tray 62 is moved downwardly against the tray 60. As the mid-tray 62 is moved against the tray 60, the protrusions 102 of the tongue 96 are snap-fit into the slots 104 of the groove 98, thereby installing the mid-tray 62 onto the tray 60.

The tongue and groove connection between the mid-tray 62 and the tray 60 establishes an exterior seam 108 at the exterior of the battery pack 24. In an embodiment, the exterior seam 108 extends between the lip 100 of the tray 60 and the lip 106 of the mid-tray 62 and extends all the way exterior surfaces of both the tray 60 and the mid-tray 62. It may be desirable to hermetically seal the external seam 108 in order to meet sealing requirements associated with the battery pack 24.

Figure 10:
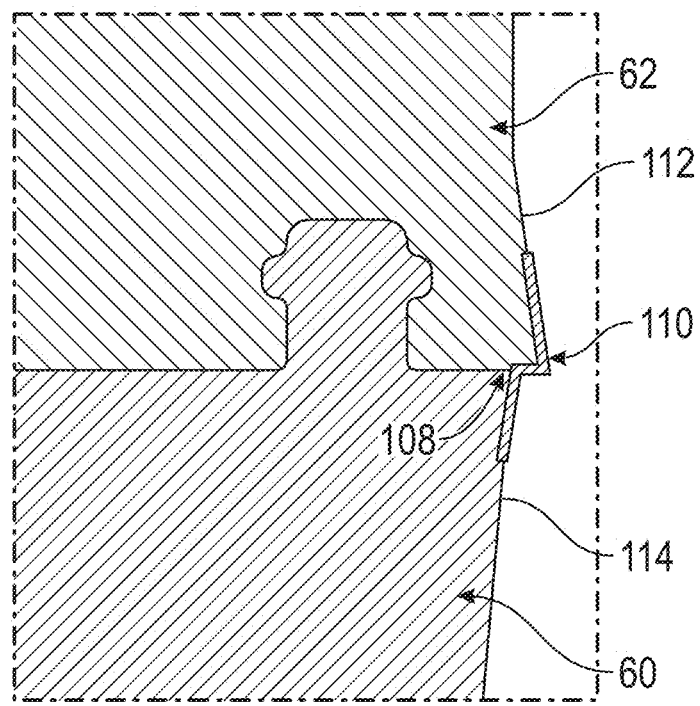
FIG. 10 illustrates a tape seal for sealing an external seam associated with a tongue and groove connection of a battery pack enclosure assembly.

FIG. 10 illustrates a tape seal 110 for hermetically sealing the exterior seam 108 at the joint between the tray 60 and the mid-tray 62. The tape seal 110 may be secured to an exterior surface 112 associated with the mid-tray 62 and to an exterior surface 114 associated with the tray 60 and may extend across the exterior seam 108 for sealing the joint. The tape seal 110 is therefore outside of the joint. The tape seal 110 may be secured via an adhesive and/or by using other fastening techniques. Exemplary tape seals can include, but are not limited to, waterproof seam tape seals, EternaBond® sealant tape sold by EternaBond®, and WebSeal® sealant tape sold by EternaBond®.

Figure 11:
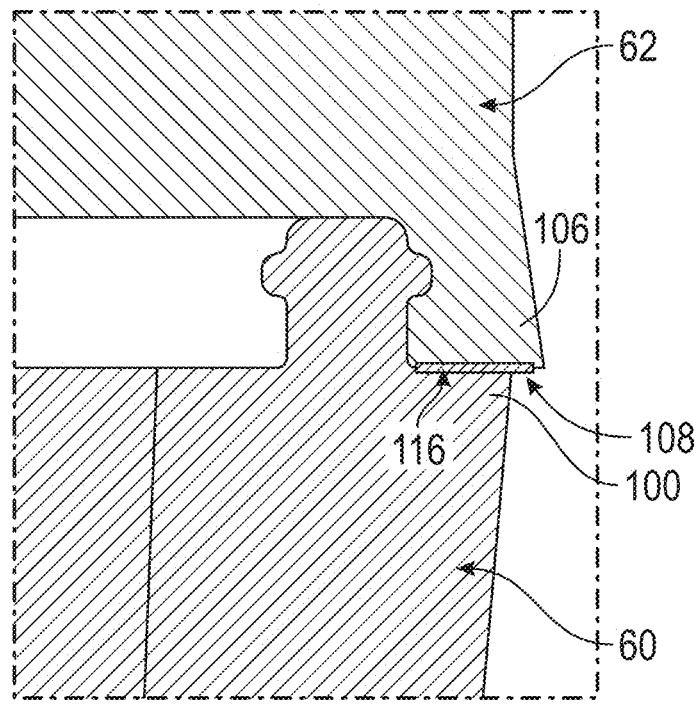
FIG. 11 illustrates a liquid seal for sealing an external seam associated with a tongue and groove connection of a battery pack enclosure assembly.

FIG. 11 illustrates a liquid seal 116 for hermetically sealing the exterior seam 108 at the joint between the tray 60 and the mid-tray 62. The liquid seal 116 may be applied between the lip 100 of the tray 60 and the lip 106 of the mid-tray, for example, for sealing the joint. The liquid seal 116 is therefore in the joint. Exemplary liquid seals can include, but are not limited to, urethane seals, epoxy seals, and room temperature vulcanizing (RTV) seals. In another embodiment, both the tape seal 110 and the liquid seal 116 can be used to seal the exterior seam 108.

Figure 12:
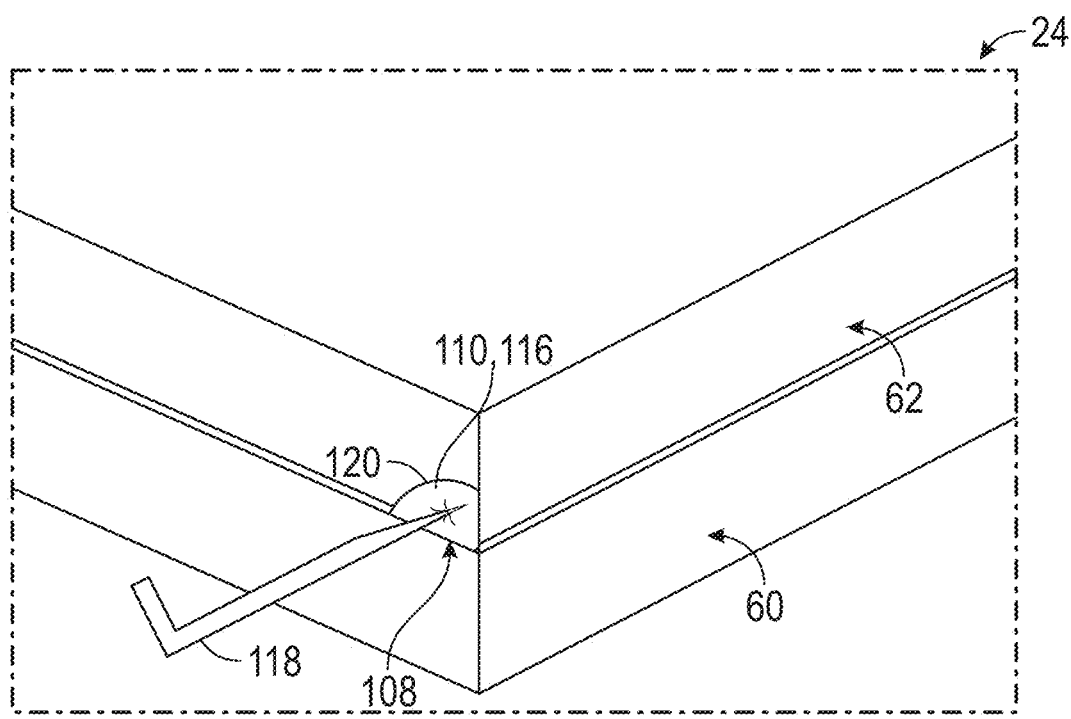
FIG. 12 schematically illustrates a method of servicing a battery pack.

The tape seal 110 and/or the liquid seal 116 may periodically need to be removed in order to service the internal contents of the battery pack 24. FIG. 12 schematically illustrates an exemplary battery pack servicing method. The servicing method may include removing the tape seal 110 and/or the liquid seal 116 in order to separate the mid-tray 62 from the tray 60.

A pry tool 118 may be used to apply the tensile load necessary for removing the tape seal 110 and/or the liquid seal 116. In an embodiment, a pry point 120 is designed in one or more corners of the battery pack 24. The pry point 120 may be configured as a relatively small, semi-circular opening or pocket configured for receiving the pry tool 118. Once received within the pry point 120, the pry tool 118 may be maneuvered across the tape seal 110 and/or the liquid seal 116 for removal. After servicing the battery pack 24, the mid-tray 62 can be reconnected to the tray 60, and then new tape seals 110/liquid seals 116 may be applied to re-seal the exterior seam 108.

Figure 13:
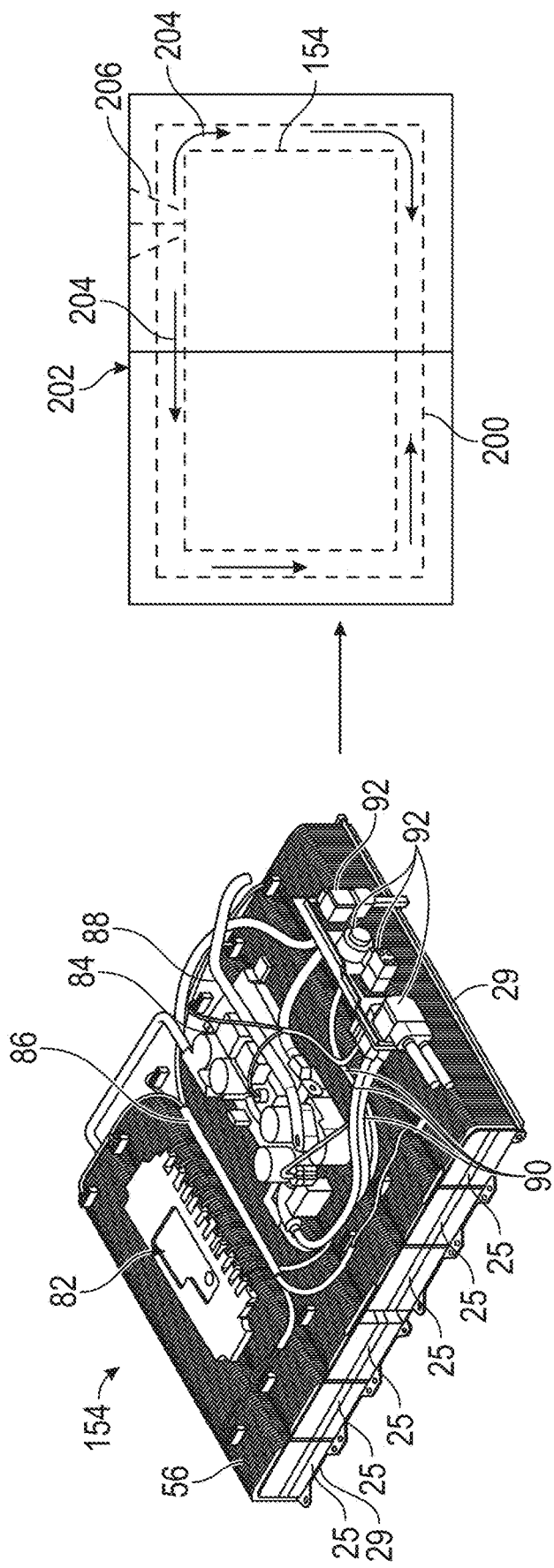
FIGS. 13, 14, and 15 schematically illustrate a method of manufacturing a battery pack that includes an expanded polymer-based enclosure assembly.
Figure 14:
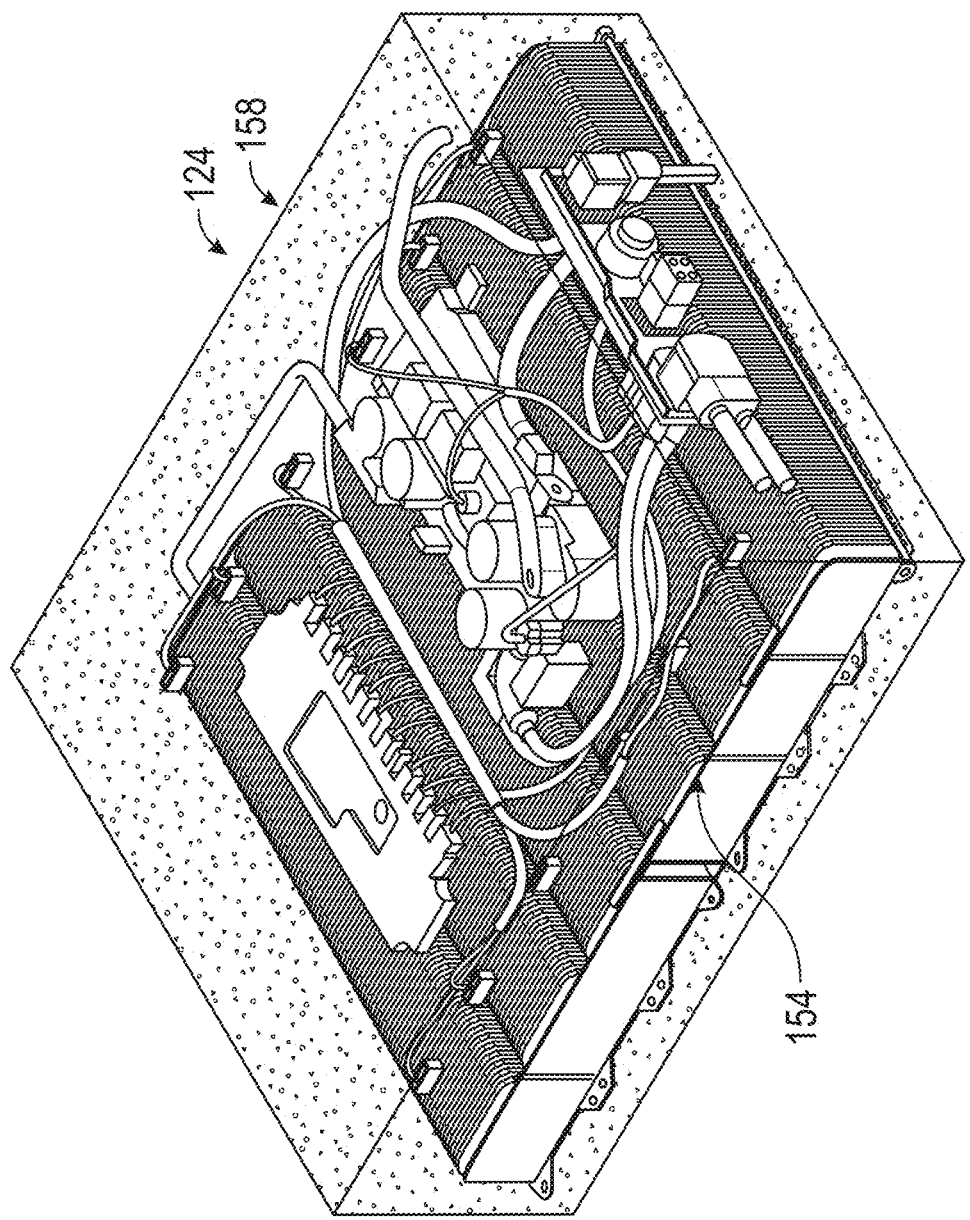
Figure 15:
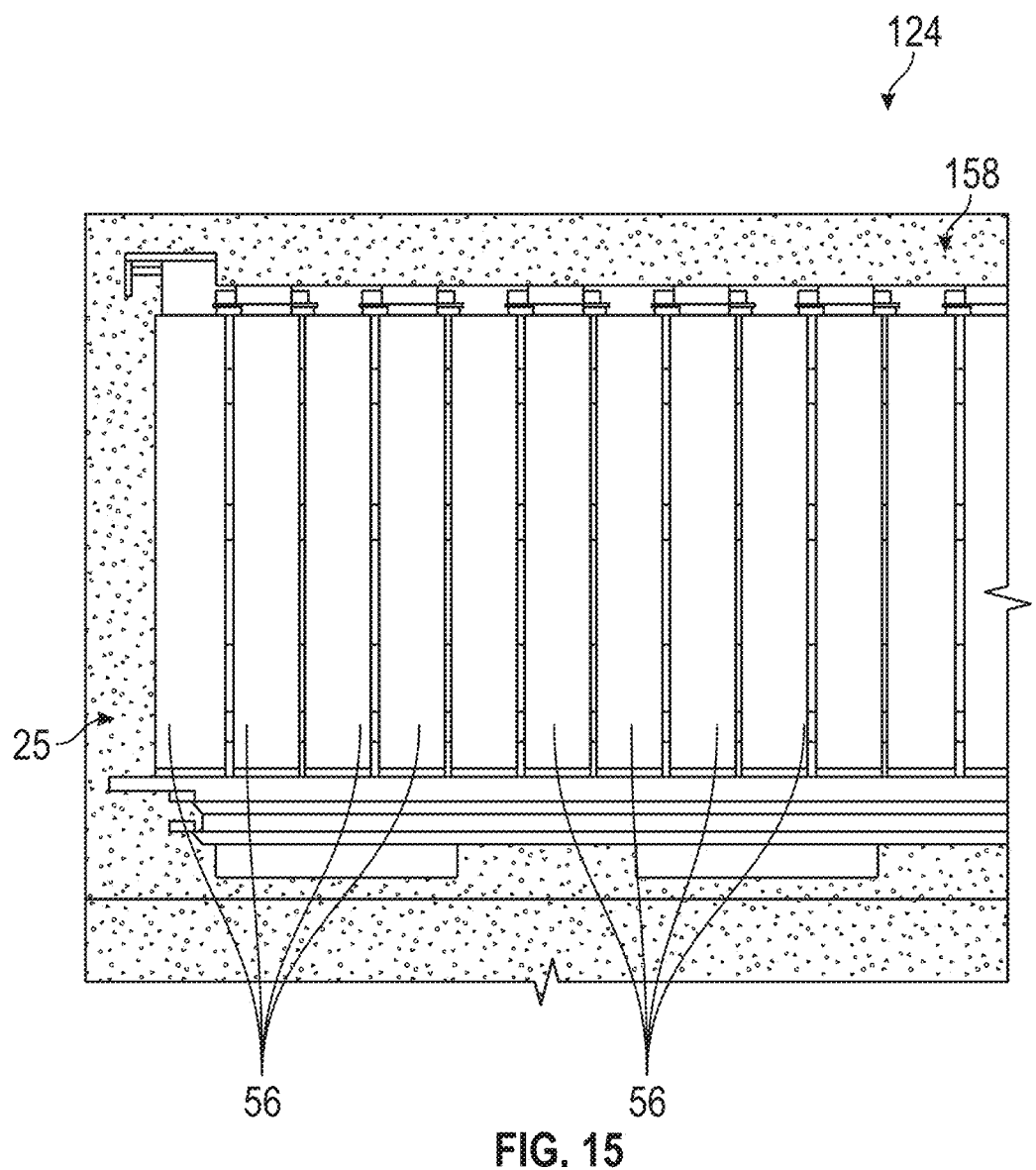

FIGS. 13, 14, and 15 schematically illustrate an exemplary method for manufacturing a battery pack 124 that includes an expanded polymer-based enclosure 158. Referring first to FIG. 13, the components of a battery system 154 of the battery pack 124 may be assembled together and staged in their relative positions with respect to one another.

Assembly of the battery system 154 may include, for example, assembling each battery array 25 by stacking the battery cells 56 together, positioning the battery arrays 25 against heat exchanger plates 29, securing a BECM 84 in place over the battery arrays 25, securing a BEC 82 in place over the battery arrays 25, attaching a first wiring harness 86 to the BEC 82 and a second wiring harness 88 to the BECM 84, and connecting the wiring looms 90 to the I/O connectors 92.

Once assembled, the battery system 154 may be positioned within a cavity 200 of a mold assembly 202. The battery system 154 may be supported by small stand-off features, clip-on supports retained to the heat exchanger plates 29, forms in the heat exchanger plates 29, end plates, or otherwise, or pin slides in the bottom of the tooling, any of which would be designed to hold the battery system 154 substantially above the bottom of the mold cavity such that an expanded polymer may flow and expand into the space therebetween and substantially or completely enclose the bottom portion of the battery system with an expanded polymer boundary. In an embodiment, the mold assembly 202 is a two-piece mold assembly. However, the specific configuration of the mold assembly 202 is not intended to limit this disclosure.

An expandable polymer foam 204 may be introduced into the cavity 200 of the mold assembly 202. In an embodiment, the expandable polymer foam 204 is injected into the cavity 200, at either low or high pressures, through a sprue 206 of the mold assembly 202.

The expandable polymer foam 204 may begin to expand around the battery system 154 once it enters into the cavity 200. During the expansion, the expandable polymer foam 204 may substantially fill in all gaps between adjacent battery cells 56 and may substantially encapsulate a majority of the components of the battery system 154 in their place.

After a relatively short amount of time, the expandable polymer foam 204 will begin to cure, thereby forming the expanded polymer-based enclosure 158 around the battery system 154 (see FIG. 14). As a result of the expansion and curing of the expandable polymer foam 204, all the gaps between the adjacent battery arrays 25, electrical bussing, wiring, BEC, BECM, and the other internal components of the battery system 154, out to the peripheral boundary of the cavity 200, will be filled and the battery system 154 will be substantially covered with a rigid, durable, and tough foam enclosure. The expanded polymer-based enclosure 158 thereby helps retain the battery system components using a minimal amount of fasteners. The use of the expandable polymer foam 204 effectively eliminates the opportunity for relative movement between the components of the battery system 154 once the curing process has completed. Use of the expanded polymer-based enclosure 158 may further facilitate the elimination of various of components that have traditionally been necessary within battery packs, such as bus bar covers over the tops of the battery arrays, battery cell spacers, array frames, array end plates, wiring insulation, and the BEC base housing, BEC bussing, and other supporting components that are part of the BEC. Employing the expandable polymer-based enclosure 158 also substantially replaces the sum of the traditional components which comprise the enclosure (tray, cover, fasteners, seals, access panels, etc.) with one, singular enclosure component: the cured expandable polymer-based enclosure 158.

As best shown in FIG. 15, which illustrates the expandable polymer-based enclosure 158 in the cured state, the expandable polymer-based enclosure 158 covers and fills all gaps around and between the battery cells 56 of each battery arrays 25. Therefore, all of the parts that are encapsulated inside the expandable polymer-based enclosure 158 are fitted together with little to no gaps or clearances therebetween. This gapless arrangement between the encapsulated components of the battery system 154 can help retain the components while also improving durability, energy absorption, and load distribution.

Figure 16:
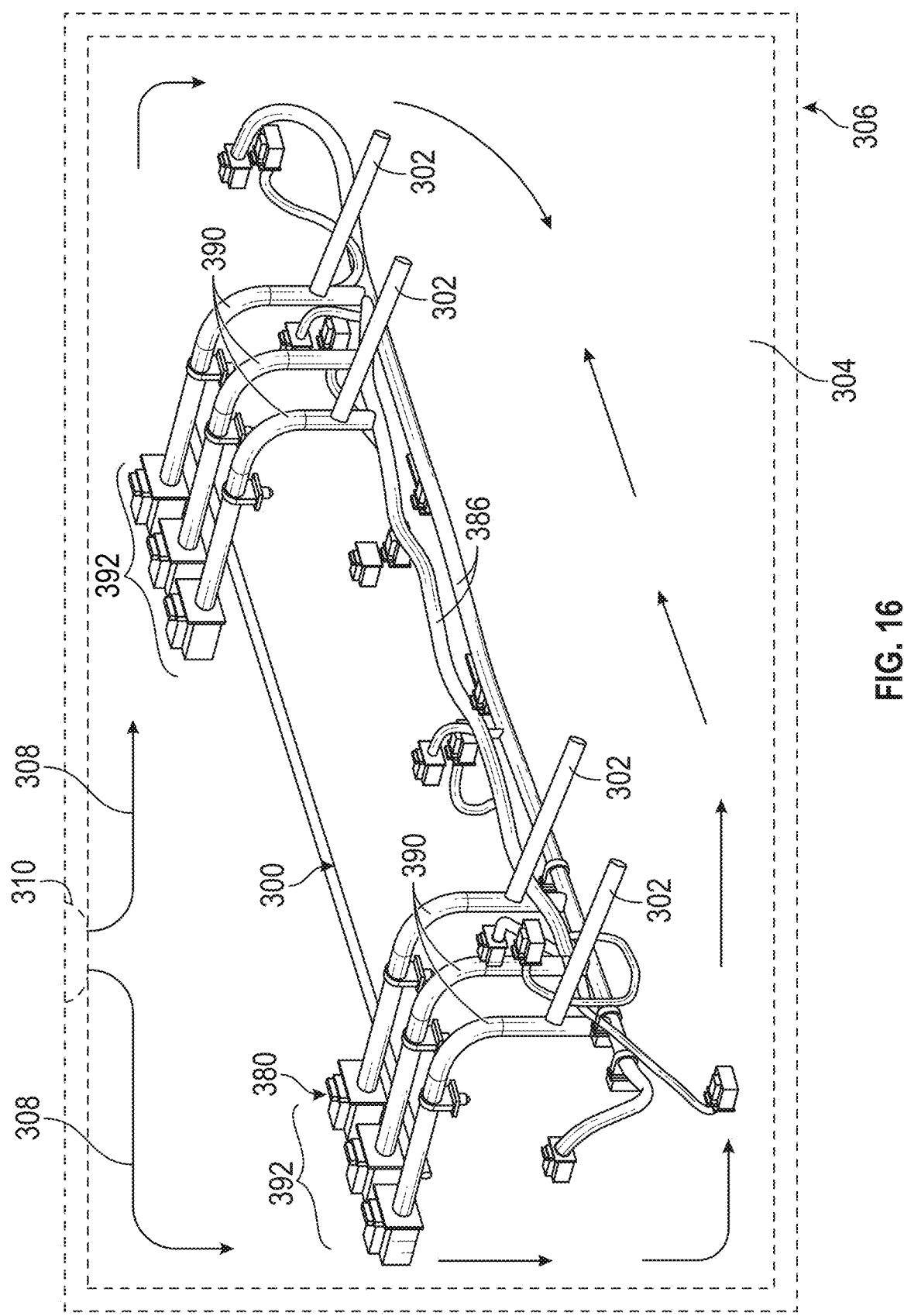
FIGS. 16 and 17 schematically illustrate another method of manufacturing a battery pack.
Figure 17:
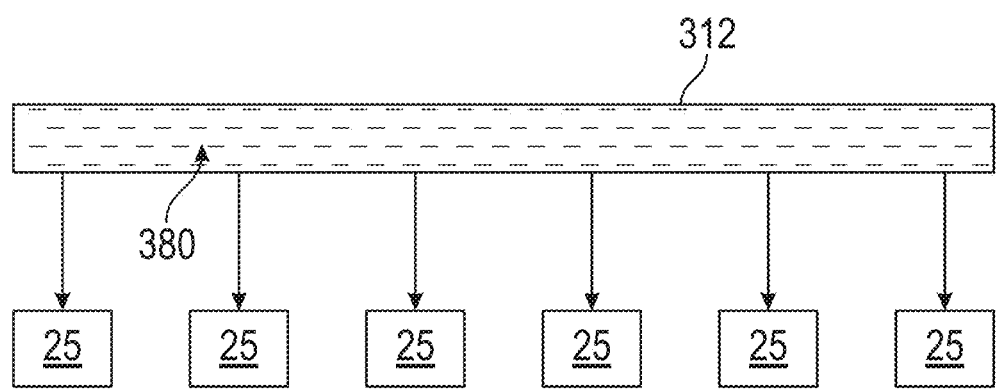

FIGS. 16 and 17 schematically illustrate another exemplary method for manufacturing a battery pack 324. Referring first to FIG. 16, the components of an electrical subassembly 380 of the battery pack 324 may be assembled together and staged in their relative positions with respect to one another. The electrical subassembly 380 may include, for example, one or more wiring harnesses 386, one or more wiring looms 390, one or more I/O connectors 392, etc.

A jig 300 may be utilized to aid in assembling the electrical subassembly 380. The jig 300 may include retractable pins 302 that are configured to maintain a spatial relationship during a fill/foam process. The retractable pins 302 may be retracted after an injected foam has cured. This may be done separately from constructing the battery arrays 25 of the battery pack 324.

Once assembled, the electrical subassembly 380 may be positioned within a cavity 304 of a mold assembly 306. An expandable polymer foam 308 may be introduced into the cavity 304 of the mold assembly 306. In an embodiment, the expandable polymer foam 308 is injected into the cavity 304, at either low or high pressures, through a sprue 310 of the mold assembly 306. The expandable polymer foam 308 may begin to expand around the electrical subassembly 380 once it enters into the cavity 304. During the expansion, the expandable polymer foam 308 may substantially fill in all gaps between adjacent components of the electrical subassembly 380 and may substantially encapsulate a majority of the components of the electrical subassembly 380 within a foam shell 312. The foam shell 312 may substantially replace the mid-tray 62 shown in the embodiment of FIGS. 2-5.

Referring to FIG. 17, the foam shell 312 with the encapsulated electrical subassembly 380 may then be positioned over and connected to the battery arrays 25 of the battery pack 324. The assembled components may then be housed within an enclosure assembly (e.g., cover and tray) of the battery pack 324.

Figure 18:
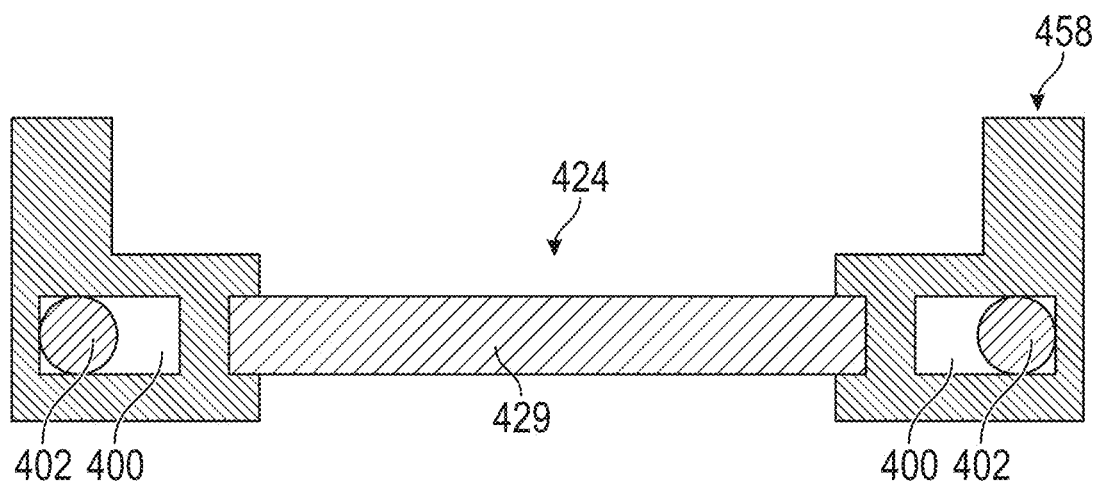
FIG. 18 illustrates a connection between a heat exchanger plate and a polymer-based enclosure of a battery pack.

FIG. 18 schematically illustrates a connection between a heat exchanger plate 429 and an expanded polymer-based enclosure 458 of a battery pack 424. The expanded polymer-based enclosure 458 may include slots 400 formed therein. The heat exchanger plate 429 may include pins 402 that are configured to engage the slots 400 to mechanically lock the heat exchanger plate 429 relative to the expanded polymer-based enclosure 458.

In another embodiment, wiring, coolant passages, or other features may be directly integrated into a polymer-based enclosure during a molding process. The internal volume of the polymer-based enclosure may therefore be leveraged to increase the energy density of a battery pack, reduce weight, simplify part retention and routing, etc.

Figure 19:
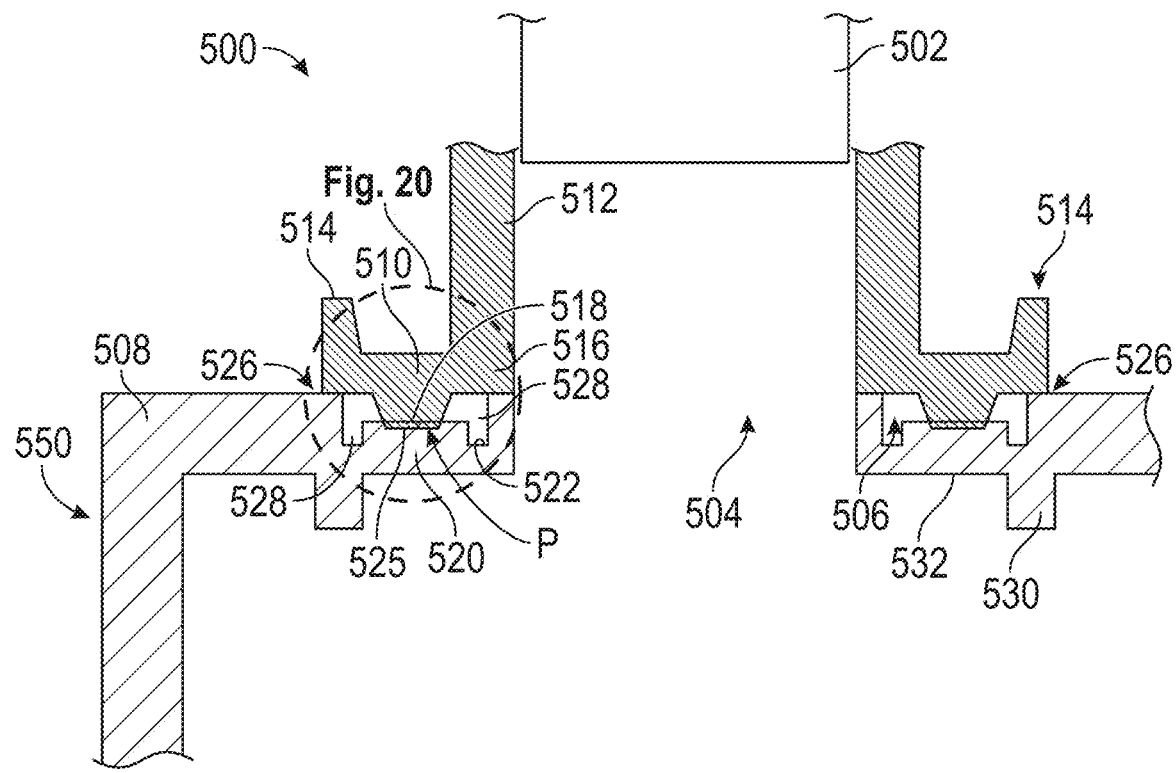
FIG. 19 illustrates an exemplary connector for connecting electrical or coolant lines to a polymer-based enclosure of a battery pack.
Figure 20:
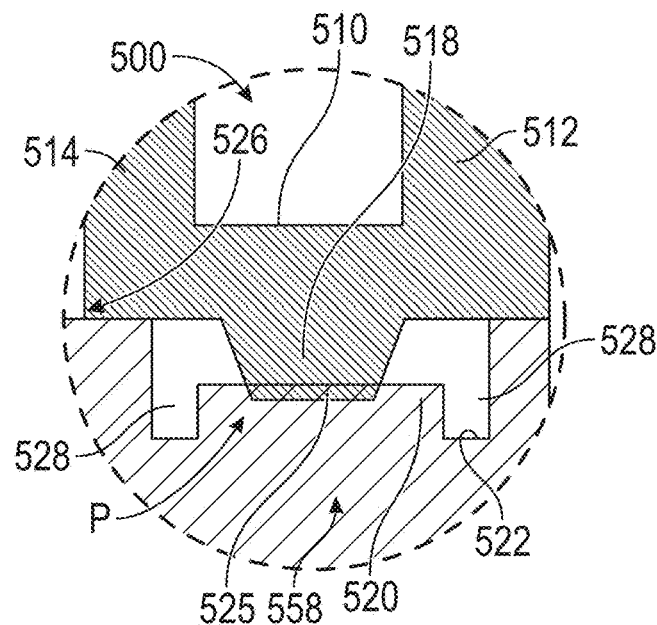
FIG. 20 is a blown up view of a portion of the connector of FIG. 19.

FIGS. 19 and 20 illustrate an exemplary connector 500 for connecting one or more electrical or coolant lines 502 to a polymer-based enclosure 558 of a battery pack 524. The electrical/coolant line(s) 502 may be utilized for connecting the battery pack 524 to components located external to the battery pack 524. The electrical/coolant line(s) 502 may include a connector head that attaches to the connector 500 and a line/conduit that is attached to the connector head.

The connector 500 may be made of a thermoplastic material that is weldable to the polymer-based enclosure 558. The thermoplastic material may be either similar or dissimilar to the material makeup of the polymer-based enclosure 558. In an embodiment, the connector 500 and the polymer-based enclosure 558 are both constructed from a solid polymer-based material.

The polymer-based enclosure 558 may include a pass-through 504 and a multi-level groove 506 that circumscribes the pass-through 504. The pass-through 504 and the multi-level groove 506 may be formed in an exterior wall 508 of the polymer-based enclosure 558. The connector 500 may be received at the multi-level groove 506 for securing (e.g., via vibration welding, laser welding, hot plate welding, etc.) the connector 500 to the polymer-based enclosure 558.

The connector 500 may include a weld flange 510, a connector body 512, and a gripping flange 514. The weld flange 510 may circumscribe a base 516 of the connector body 512, and the connector body 512 may protrude outwardly from the base 516. The connector body 512 may receive a portion (e.g., a connector head) of the electrical/coolant line 502 for securing the electrical/coolant line 502 to the battery pack 524.

The weld flange 510 of the connector 500 may include an interference contact bead 518 that is received within the multi-level groove 506. In an embodiment, the interference contact bead 518 includes a trapezoidal cross-sectional shape. However, other shapes are also contemplated within the scope of this disclosure.

The interference contact bead 518 may be received in abutting contact with a sub-flush center portion 520 of the multi-level groove 506. The sub-flush center portion 520 may protrude outwardly from a floor 522 of the multi-level groove 506. A portion 525 of the interference contact bead 518 may overlap the sub-flush center portion 520, thereby establishing a friction contact point P for welding the connector 500 to the polymer-based enclosure 558. A sub-flush pocket 528 may extend to the floor 522 at each side of the sub-flush center portion 520 for catching any displaced and//or deformed material during the welding operation.

A contact surface 526 of the weld flange 510 may come into contact with the exterior wall 508 of the polymer-based enclosure 558 just upon the completion of the welding process. Initially, the contact surface 526 is held apart from exterior wall 508 by the interference condition of the interference contact bead 518 and the sub-flush center portion 520. In an embodiment, the contact surface 526 is located outboard of the interference contact bead 518.

The gripping flange 514 may extend outwardly from the weld flange 510 and establishes a surface area for holding the connector 500 during the welding process. In an embodiment, the gripping flange 514 may be gripped by a weld horn of a vibration welding device. An additional gripping flange 530 may be provided at an interior surface 532 of the exterior wall 508 of the polymer-based enclosure 558 for keeping the polymer-based enclosure 558 stationary during the welding process. In an embodiment, the gripping flange 530 may be gripped by a weld anvil of a vibration welding device. The gripping flanges 514, 530 may additionally ensure that a compressive force is aligned between the welding horn and the welding anvil during the welding process.

Figure 21:
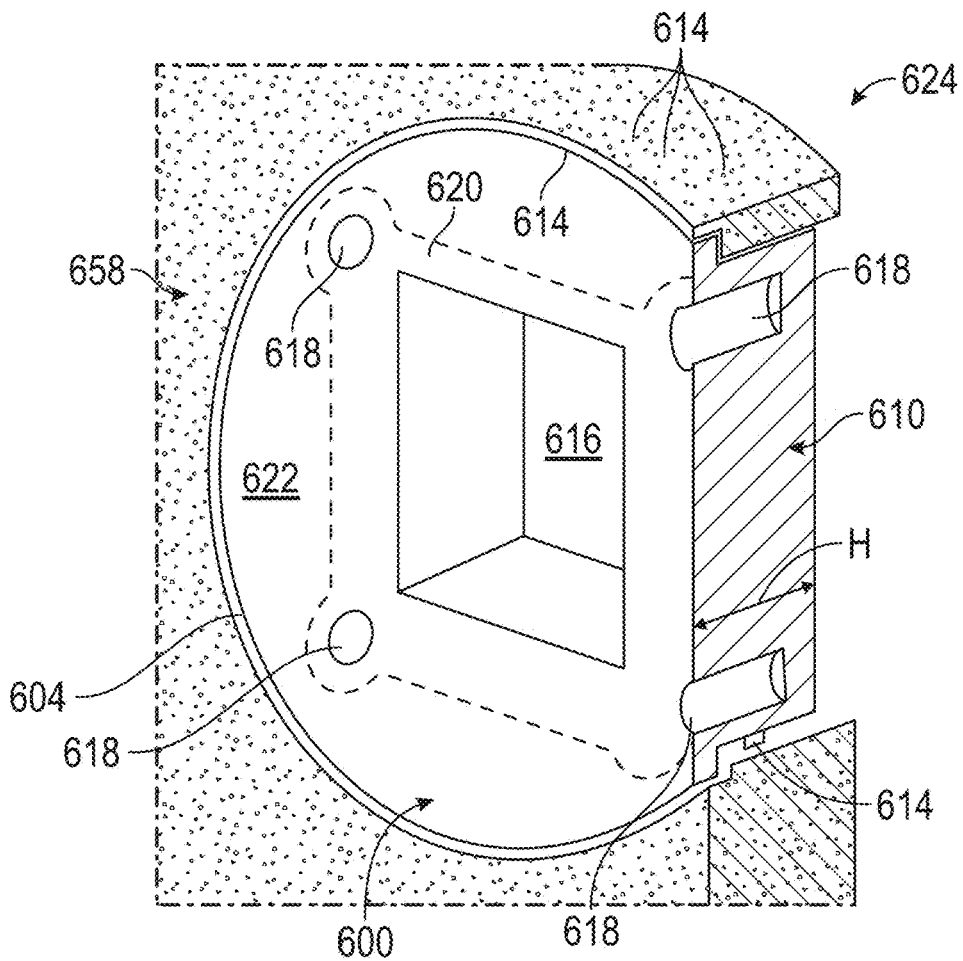
FIG. 21 illustrates another exemplary connector for connecting electrical or coolant lines to a polymer-based enclosure of a battery pack.

FIG. 21 illustrates another exemplary connector 600 for connecting electrical or coolant lines (not shown) to a polymer-based enclosure 658 of a battery pack 624. The electrical/coolant line(s) may be utilized for connecting the battery pack 624 to components located external to the battery pack 624. The connector 600 could be an intermediate connector that receives an additional bulkhead connector for connecting the electrical/coolant line(s), or, in some embodiments, the connector 600 could directly receive the electrical/coolant line(s).

The connector 600 may be made of a thermoplastic material that is weldable to the polymer-based enclosure 658. The thermoplastic material may be either similar or dissimilar to the material makeup of the polymer-based enclosure 658. In an embodiment, the connector 600 is constructed of a solid polymer-based material, and the polymer-based enclosure 558 is constructed of an expanded polymer-based material.

The polymer-based enclosure 658 may include a pass-through 604 formed in an exterior wall of the polymer-based enclosure 658. The connector 600 may be received within (e.g., pushed into) the pass-through 604 for securing (e.g., via spin welding, etc.) the connector 600 to the polymer-based enclosure 658.

The connector 600 may include a tapered cylindrical body 610. An outer cylindrical surface 612 of the tapered cylindrical body 610 may include texturing 614 for increasing friction between the connector 600 and the polymer-based enclosure 658. The tapered cylindrical body 610 may be made thicker than traditional connectors such that it has a relatively significant cylindrical side wall height H in order to occupy more volume of the polymer-based enclosure 658, thereby creating more weld melt as the connector 600 is forced into the substantially undersized pass-through 604.

A pass-through 616 may be formed through the tapered cylindrical body 610. The pass-through 616 may be sized and shaped for receiving a portion of an electrical/coolant line. In an embodiment, the pass-through 616 may be configured for receiving the inner terminal housings of a bulkhead connector of the electrical/coolant line such that the terminal housings can clip into the tapered cylindrical body 610.

The tapered cylindrical body 610 may additionally include a plurality of retention holes 618 for mounting an additional bulkhead connector to the connector 600. A bearing surface 620 may be provided at an exterior wall 622 of the tapered cylindrical body 610 for receiving a suitable seal.

The connector 600 may additionally include a suitable ground point (not depicted) that is designed to engage a ground shield ring of the electrical/coolant line connector. The ground point thus provides a convenient location to connect an EMC ground path to a suitable feature either inside or outside of the battery pack 624.

The exemplary battery packs of this disclosure include enclosure assemblies that incorporate features for sealing external joints, retaining internal components, and securing electrical/coolant lines to the battery pack. The proposed designs reduce the number of overall parts in assembly, such as fasteners and brackets, and simplify the overall battery pack manufacturing and assembly processes.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A traction battery pack, comprising:
   an electrical subassembly;
   a foam shell disposed around the electrical subassembly to establish a foamed electrical subassembly; and
   a battery array positioned in contact with the foamed electrical subassembly,
   wherein the foam shell substantially fills all gaps between adjacent components of the electrical subassembly to provide a gapless arrangement.

2. The traction battery pack as recited in claim 1, wherein the foamed electrical subassembly and the battery array are housed within a polymer-based enclosure assembly.

3. The traction battery pack as recited in claim 2, wherein the polymer-based enclosure assembly includes a tray comprised of an expanded polymer-based material and a cover comprised of a solid polymer-based material that is more rigid than the expanded polymer-based material.

4. The traction battery pack as recited in claim 2, comprising a connector secured to the polymer-based enclosure assembly, wherein the connector includes a connector body and a weld flange that circumscribes the connector body.

5. The traction battery pack as recited in claim 4, comprising an electrical line or a coolant line secured to the connector body.

6. The traction battery pack as recited in claim 4, wherein the connector is comprised of a thermoplastic material that is weldable to the polymer-based enclosure assembly at the weld flange.

7. A traction battery pack, comprising:
   an electrical subassembly;
   a foam shell disposed around the electrical subassembly to establish a foamed electrical subassembly;
   a battery array positioned in contact with the foamed electrical subassembly, wherein the foamed electrical subassembly and the battery array are housed within a polymer-based enclosure assembly; and
   a connector secured to the polymer-based enclosure assembly, wherein the connector includes a connector body and a weld flange that circumscribes the connector body,
   wherein the connector is comprised of a thermoplastic material that is weldable to the polymer-based enclosure assembly at the weld flange,
   wherein an interference contact bead of the weld flange is received within a multi-level groove formed in the polymer-based enclosure assembly.

8. The traction battery pack as recited in claim 4, wherein the connector includes a gripping flange that extends outwardly from the weld flange and establishes a surface area for holding the connector.

9. The traction battery pack as recited in claim 2, wherein the polymer-based enclosure assembly includes a slot, and further comprising a heat exchanger plate having a pin that is configured to engage the slot to mechanically lock the heat exchanger plate relative to the polymer-based enclosure assembly.

10. The traction battery pack as recited in claim 1, wherein the electrical subassembly includes one or more wiring harnesses, one or more wiring looms, and one or more I/O connectors.

11. The traction battery pack as recited in claim 1, wherein the foamed electrical subassembly is positioned over top of the battery array, over top of a second battery array, and over top of a third battery array.

12. The traction battery pack as recited in claim 1, wherein the foam shell is comprised of an expandable polymer foam.

13. A traction battery pack, comprising:
    a polymer-based enclosure assembly including a tray and a cover;
    a battery array assembly positioned within an open area of the tray,
    the battery array assembly including a plurality of battery arrays and a foamed electrical subassembly positioned over the plurality of battery arrays; and
    the foamed electrical subassembly including an electrical subassembly and a foam shell that substantially encapsulates the electrical subassembly.

14. The traction battery pack as recited in claim 13, wherein the tray is comprised of an expanded polymer-based material, and the cover is comprised of a solid polymer-based material that is more rigid than the expanded polymer-based material.

15. The traction battery pack as recited in claim 13, wherein the electrical subassembly includes one or more wiring harnesses, one or more wiring looms, and one or more I/O connectors.

16. The traction battery pack as recited in claim 13, wherein the foam shell substantially fills all gaps between adjacent components of the electrical subassembly to provide a gapless arrangement.

17. The traction battery pack as recited in claim 13, wherein the foam shell wherein the foam shell is comprised of an expandable polymer foam.

18. The traction battery pack as recited in claim 13, comprising a connector that includes a weld flange having an interference contact bead received within a multi-level groove of the polymer-based enclosure assembly.

19. The traction battery pack as recited in claim 2, comprising a connector that includes a weld flange having an interference contact bead received within a multi-level groove of the polymer-based enclosure assembly.

* * * * *